(No Model.) 3 Sheets—Sheet 1.
R. R. BOYD.
COTTON SEED DELINTER.
No. 563,647. Patented July 7, 1896.
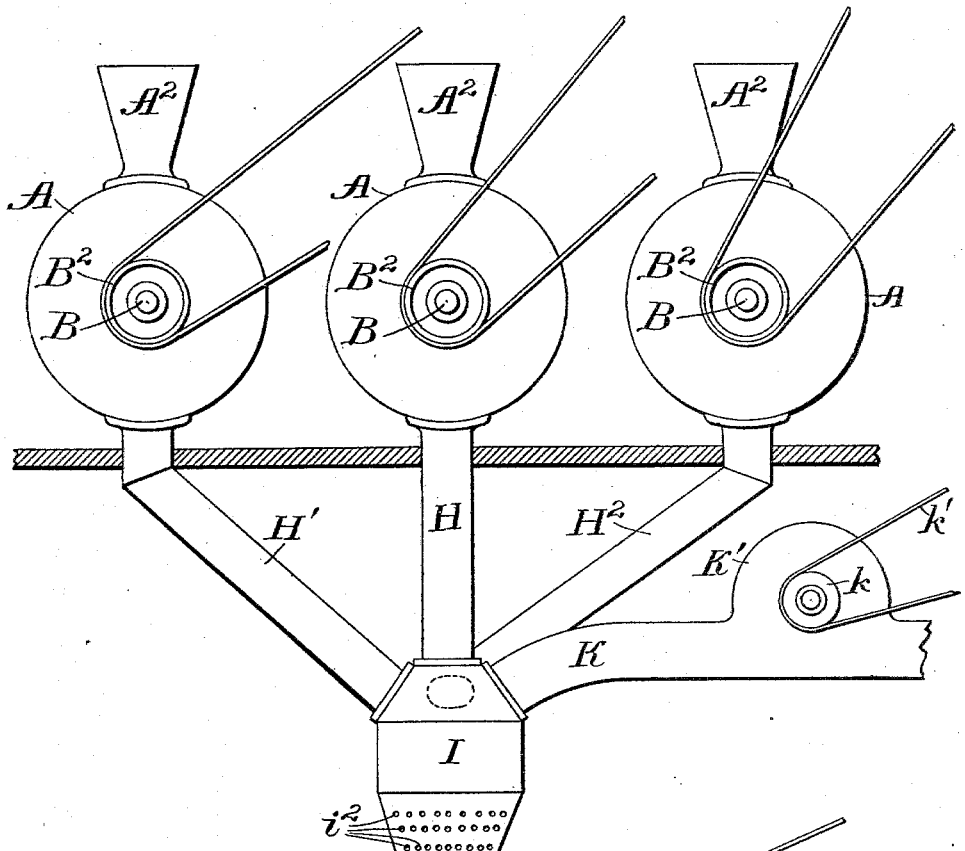
FIG. 1.
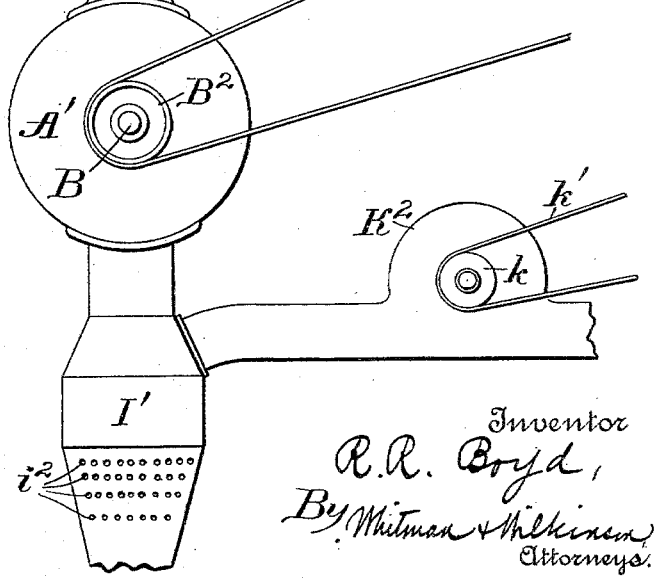
Witnesses
Percy C. Bowen
John C. Wilson
Inventor
R. R. Boyd,
By Whitman & Wilkinson
Attorneys.

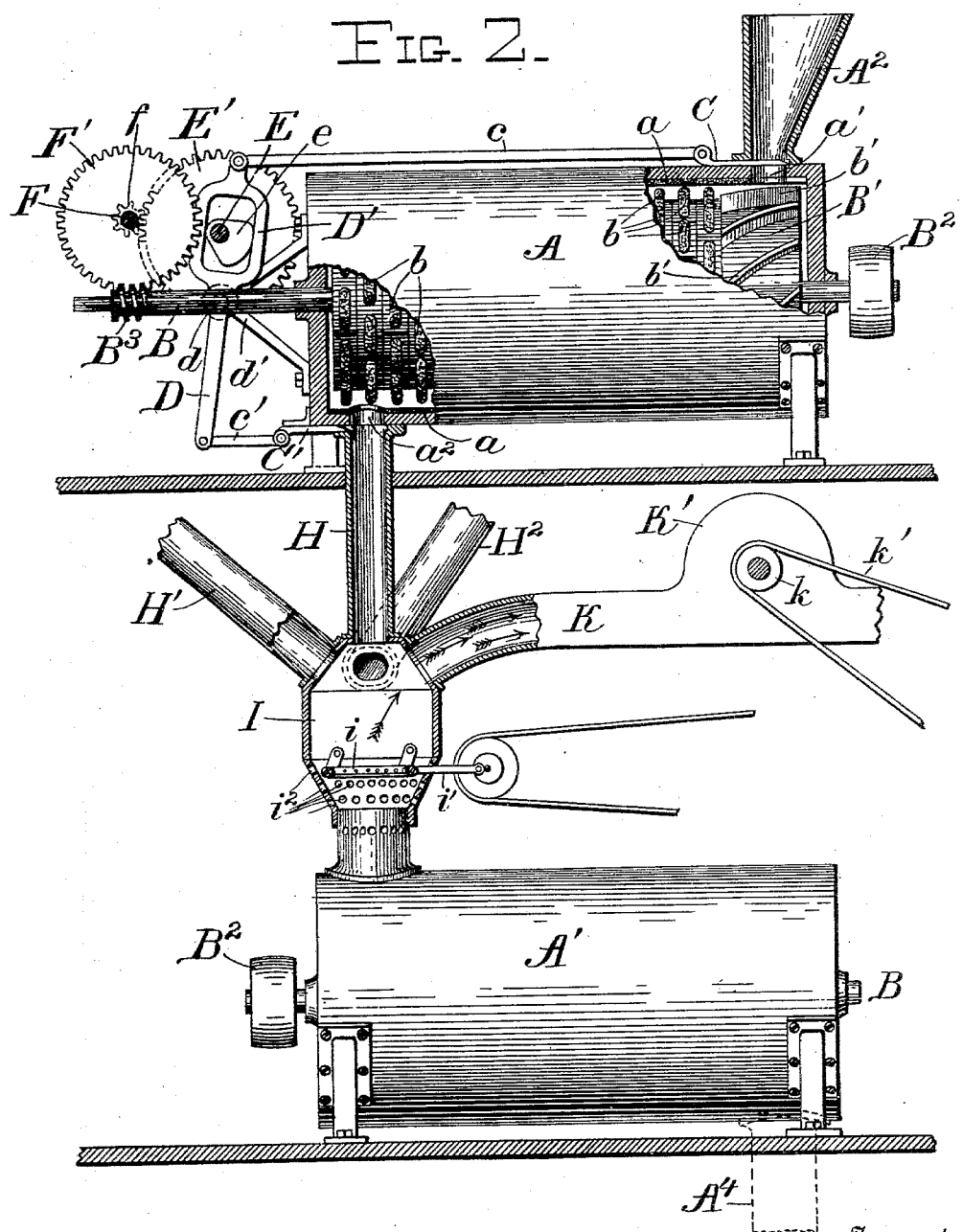

(No Model.) 3 Sheets—Sheet 3.
R. R. BOYD.
COTTON SEED DELINTER.
No. 563,647. Patented July 7, 1896.
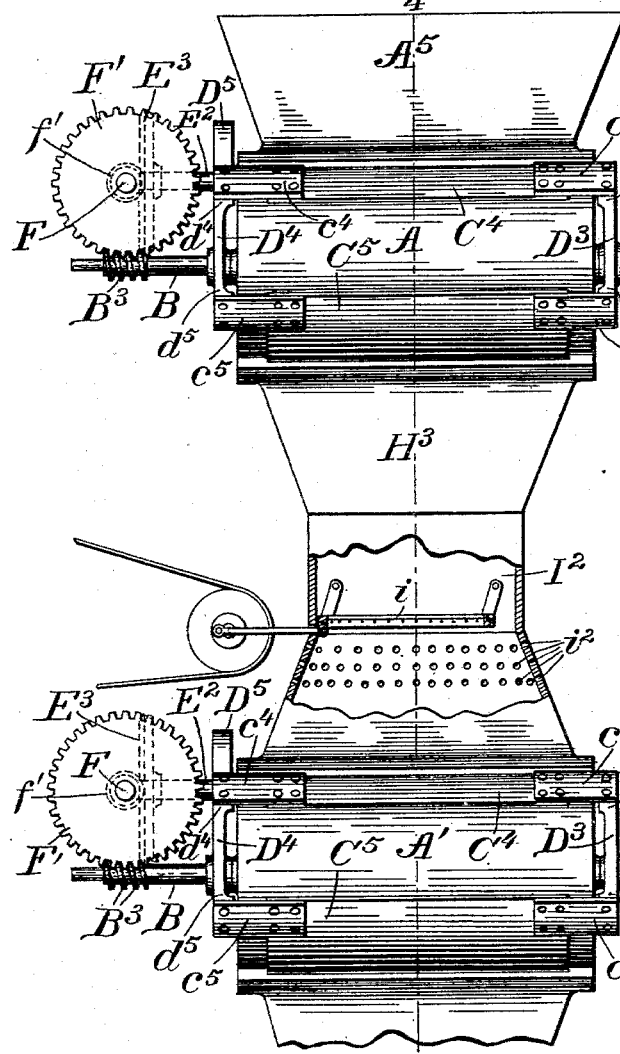
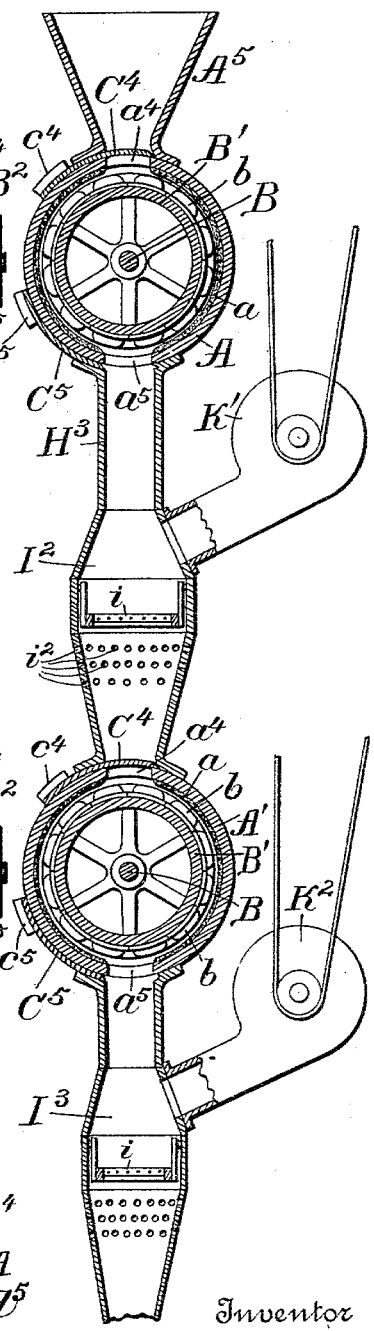
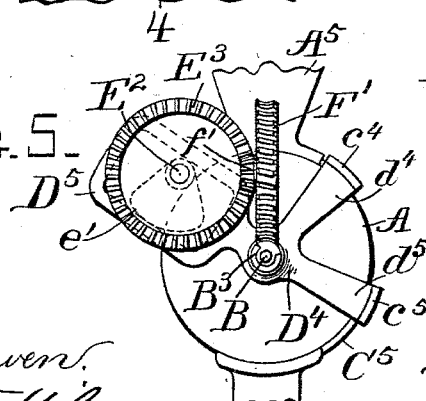
Witnesses
Percy C. Bowen
John C. Wilson
Inventor
R. R. Boyd,
By Whitman & Wilkinson
Attorneys.
THE NORRIS PETERS CO., PHOTO-LITHO., WASHINGTON, D. C.

UNITED STATES PATENT OFFICE.

ROBERT R. BOYD, OF MEMPHIS, TENNESSEE.

COTTON-SEED DELINTER.

SPECIFICATION forming part of Letters Patent No. 563,647, dated July 7, 1896.

Application filed January 25, 1896. Serial No. 576,867. (No model.)

*To all whom it may concern:*

Be it known that I, ROBERT R. BOYD, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to that special class of machines known as "delinters," which act upon the cotton-seed after it has been ginned; and it consists of the improved construction, combination, and arrangement of parts hereinafter described and claimed.

Reference is had to the accompanying drawings, in which the same parts are indicated by the same letters throughout the several views.

Figure 1 represents a diagrammatic view of a system of delinters in which three machines act upon the seed first and discharge the nearly-delinted seed into a fourth machine, where the operation of delinting is finished. Fig. 2 represents a side elevation of two of the machines shown in Fig. 1, parts being broken away to show the details of construction. Fig. 3 represents a similar view of a modified form of apparatus. Fig. 4 represents a sectional view of the same, taken on the line 4 4 of Fig. 3. Fig. 5 is a detail end view of one of the machines, showing the means for automatically opening and closing the inlet and outlet openings.

In Fig. 2, A represents a delinter, the outer casing of which is cylindrical, as shown, and is lined with an abrading-surface $a$, preferably of emery. Within the cylindrical casing A, and mounted upon the central shaft B, is an abrading-cylinder B', the periphery of which is provided with a series of projections $b$, covered with emery. The shaft B, on which the inner cylinder is mounted, extends through the ends of the outer casing and has mounted thereon at one end a driving-pulley $B^2$ driven from any suitable source of power. On the other end of the shaft B is a worm $B^3$ for a purpose to be hereinafter explained.

On the top and at one end of the casing A is an inlet-opening $a'$, having a hopper or other conducting-pipe $A^2$, through which the seed may be fed. Just below the said inlet $a'$ the inner cylinder B is provided with short flanges $b'$, arranged spirally around its periphery to start the seed toward the opposite end and push them between the abrading-surfaces $a$ and $b$ as soon as they fall upon the inner cylinder. At the bottom of the outer casing and at the opposite end from the inlet $a'$ is an outlet $a^2$ for the discharge of the seed and lint.

To prevent the seed and lint from becoming choked between the abrading-surfaces, I provide the slides C and C' for opening and closing the openings $a'$ and $a^2$ periodically, and these slides are connected by the connecting-rods $c$ and $c'$, respectively, to the opposite ends of a lever D. The said lever D is pivoted at its center, as at $d$, to a suitable support $d'$, and one arm thereof is made in the form of a cam-yoke, as at D', to receive the cam $e$ on a shaft E, which carries also a toothed wheel E', meshing with a pinion $f$ on a shaft F, and the shaft F carries a worm-wheel F', meshing with the worm $B^3$ on the central shaft B of the cylinder. This central shaft B will usually be run at a speed of about seven hundred revolutions per minute, and the sizes of the worm and the several gear-wheels are so proportioned that the cam-shaft E will make about two revolutions per minute, thus opening and closing the slides C and C' alternately twice in a minute. The cam $e$ is so formed that each slide will remain wide open (while the other is closed) for about one-quarter of a revolution of the cam-shaft E, and thus the feed-inlet and discharge-outlet are alternately opened and closed. Any other convenient means for effecting this alternate opening and closing may be adopted, if desired, or the feed-opening may at all times be left open.

The discharge-pipe H conducts the seed and lint from the outlet $a^2$ to the separating-chamber I, where they fall on a screen $i$, which is kept in motion by any suitable means, as, for instance, a link $i'$, connected to any part of the machinery to give it a suitable reciprocating motion. The chamber I is perforated below the screen $i$, as at $i^2$, and to the upper part of the said chamber is connected a pipe K from a suction-fan K', which fan is driven from any part of the machinery by a belt $k'$ and pulley $k$. This fan creates a draft of air through the perforations $i^2$, upward through the screen $i$ and through the suction-pipe K, drawing off all the lint that has been detached from the seed by the action of the delinting-cylinder B'. The seed, and whatever lint may adhere thereto after this first operation, will be shaken through the screen $i$ and will fall into a second delinter A', the internal construction of which is precisely like the first delinter A, and which may or may not have its inlet and outlet opened and closed periodically.

From the second delinter the seed may be discharged into another chamber I and the lint drawn off by another fan similar to the fan K', as shown in Fig. 1.

About eighty per cent. of the lint, more or less, is removed from the seed in the first delinter A, and when this is drawn off from the chamber I the bulk of the seed is so reduced that the second delinter A' will have sufficient capacity to receive the seed from more than one, or several delinters, as shown in Fig. 1, where three delinters A are shown, all discharging into a common chamber I through the pipes H, H', and $H^2$. The first and best quality lint is drawn off by the fan K'. The seed from the three delinters A then passes into one second delinter A', where nearly all of the remaining lint is detached, and the seed and lint are discharged into a second separator I', similar to the separator I, where the second quality or short lint is drawn off by the fan $K^2$, and the clean seed are discharged into a suitable receptacle.

In Figs. 3, 4, and 5 I have shown a modified form of device, in which the inlets and outlets in the outer casing extend longitudinally nearly the whole length of the casing.

The outer casings A and A' of the delinters are lined with emery, as at $a$, and the inner cylinder B' has the abrading projections $b$, as in the former instance, but the spiral flanges $b'$ may be omitted as the seed is fed along the whole length of the cylinder. The inlet $a^4$ is placed along the top of the outer casing and the outlet $a^5$ is placed along the bottom, and both are provided with sliding doors $C^4$ and $C^5$, respectively. These doors are curved to conform to the circumference of the casing and arranged to slide circumferentially thereon. The end of the sliding doors $C^4$ and $C^5$ are connected by extension-pieces $c^4$ and $c^5$ with the arms $d^4$ and $d^5$ of the spiders $D^3$ and $D^4$, pivoted upon the central shaft B at each end of the casing. One of the spiders $D^4$ has, in addition to the arms $d^4$ and $d^5$, a cam-yoke $D^5$, in which rotates the cam $e'$ upon the shaft $E^2$. A bevel gear-wheel $E^3$ is also secured to the shaft $E^2$ and meshes with a bevel-pinion $f'$ on the shaft F, which carries the worm-wheel F', meshing with the worm $B^3$ on the shaft B. Thus the rotation of the central shaft B will, through the train of gearing just described, rotate the cam $e'$, and thus oscillate the spiders $D^3$ and $D^4$, causing them to slide the doors $C^4$ and $C^5$ and open and close the openings $a^4$ and $a^5$ alternately and periodically.

The seed is fed to the inlet $a^4$ through the hopper $A^5$, and when the slide $C^4$ is open will flow on the abrading-cylinder B'. The abrading-cylinder, rotating at about seven hundred revolutions per minute, more or less, will rub the seed against the emery lining of the casing, thus detaching the lint therefrom, and when the outlet $a^5$ is opened the seed and loose lint will fall through the spout $H^3$ to the separating-chamber $I^2$, where they fall upon the vibrating screen $i$, which is kept in motion, as hereinbefore described.

The chamber $I^2$ has perforations $i^2$, through which air is drawn upward through the screen $i$ by the fan K'. This current of air will carry off the lint detached by the first delinter, which will make the first-quality lint, while the seed will drop through the screen $i$ or other agitating device to the second delinter, which operates in all respects like the first and cleans off the lint remaining upon the seed, the loose lint and seed falling upon the moving screen $i$ in a second separating-chamber $I^3$, from which the lint is drawn off by a second fan $K^2$, this lint being the second-quality lint. Should it be found necessary in practice, the seed may be passed through a third, or even a fourth, delinter, and the number of delinters used in each step may be decreased to correspond with the decreased bulk of the seed.

Among the advantages of the herein-described machine are an enlarged output and better quality of work with a given expenditure of power.

The seed by being subjected to two or more scourings and passing through a current of air between each scouring are kept from becoming excessively hot. Different grades of lint are obtained and each grade separate from the others.

I do not wish to limit myself to any particular number or arrangement of machines or fans, as the number may be varied to suit the requirements of the work to be done.

It will be obvious that various modifications in the herein-described apparatus might be made which could be used without departing from the spirit of my invention.

Having thus described my invention, what I claim, and desire to secure by Letters Patent of the United States, is—

1. In an apparatus of the character described, the combination with a pair of delinters arranged one above the other, of an interposed separating-chamber, closed passages connecting the separating-chamber with the upper delinter and lower delinter, said separating-chamber being provided with perforations in the walls thereof, a vibrating sieve mounted in said separating-chamber above said perforations, an air-passage opening into the upper part of said separating-chamber, and means for drawing air upward through said chamber and into said air-passage, substantially as described.

2. In an apparatus of the character described, the combination with a plurality of delinters opening downward, a common separating-chamber receiving the seed and lint from all of said delinters, the said separating-chamber having perforations in the lower portion of the walls thereof, and an air-passage with means for drawing air therethrough opening into the upper portion of said separating-chamber, a vibrating sieve mounted in said separating-chamber above said perforations, a single delinter mounted below said separating-chamber, and a passage connecting said chamber with said lower delinter substantially as described.

3. In an apparatus of the character described, the combination with a pair of delinters arranged one above the other, of an interposed separating-chamber made rectangular in shape with its upper and lower ends in the form of frustums of pyramids, and having the lower frustum perforated as shown, a vibrating screen mounted in said chamber above said perforations, a passage connecting the upper end of the said chamber with the upper delinter, and a passage connecting the lower end of said chamber with the lower delinter, an air-passage opening into the upper portion of said chamber, and a fan for drawing air therethrough, substantially as described.

4. In an apparatus of the character described, the combination with a plurality of delinters opening downward, a common separating-chamber receiving the seed and lint from all of the said delinters, the said separating-chamber being rectangular in cross-section with its upper and lower ends in the form of frustums of pyramids, and the lower frustum being perforated as shown, a vibrating sieve mounted in said chamber above said perforations, an air-passage opening into the upper part of said separating-chamber with a fan for drawing air therethrough, a single delinter mounted below said separating-chamber, and air-passages connecting all of said delinters with said separating-chamber, substantially as described.

In testimony whereof I affix my signature in presence of two witnesses.

ROBERT R. BOYD.

Witnesses:
F. T. EDMONDSON,
R. B. RICHARDSON.